(No Model.)
C. RACH.
COCOA PRODUCT AND PROCESS OF MAKING SAME.
No. 549,531.  Patented Nov. 12, 1895.
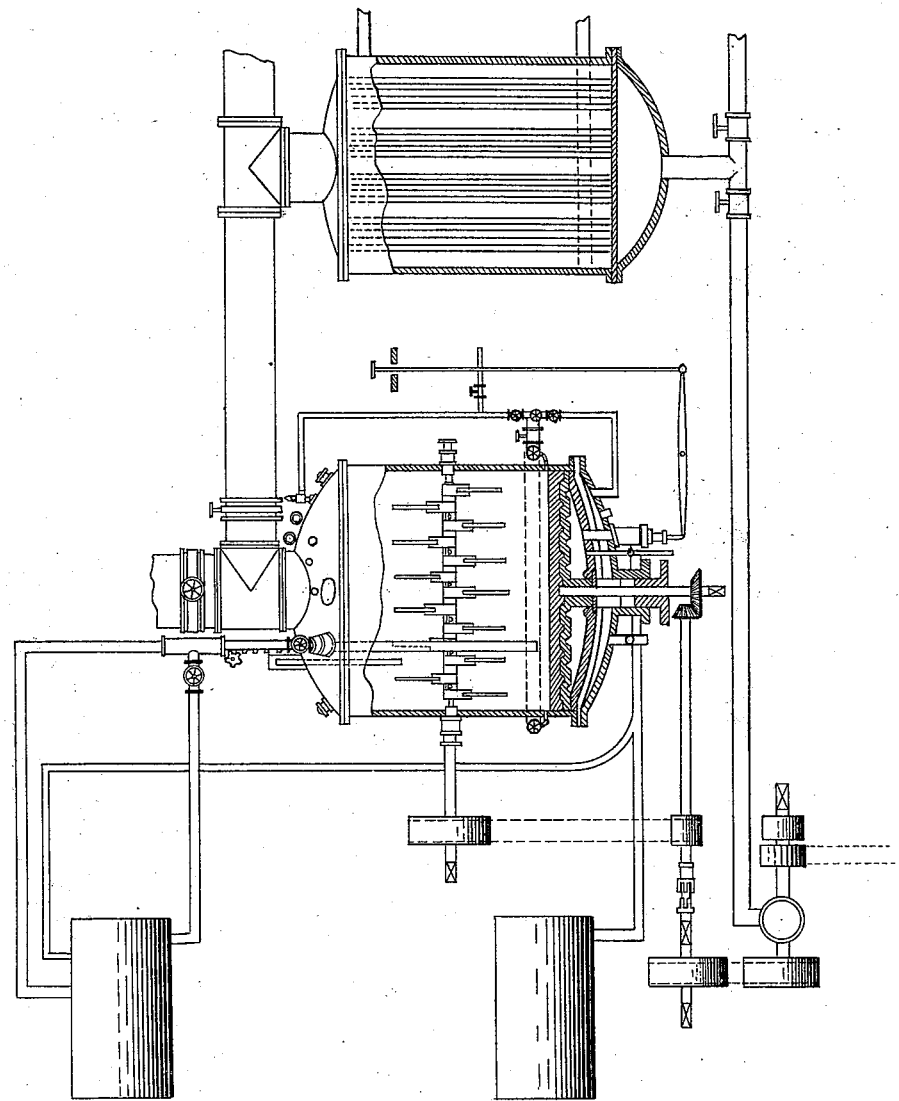

UNITED STATES PATENT OFFICE.

CARL RACH, OF CHICAGO, ILLINOIS.

COCOA PRODUCT AND PROCESS OF MAKING SAME.

SPECIFICATION forming part of Letters Patent No. 549,531, dated November 12, 1895.

Application filed September 15, 1894. Serial No. 523,078. (No specimens.)

*To all whom it may concern:*

Be it known that I, CARL RACH, a subject of the King of Prussia, residing at Chicago, in the county of Cook and State of Illinois, have invented certain new and useful Improvements in Cocoa Preparations, of which the following is a specification.

My invention relates to improved processes and products connected with and relating to cocoa.

It has for its object to provide a new process for decomposing and rendering soluble in water the cocoa-butter of cocoa, so as to produce a soluble cocoa.

It has for its further object to produce a cocoa compound that is easily soluble in water.

It has for its further object a process for combining with soluble cocoa the solid substance of milk.

It has for its further object to produce a soluble compound composed of cocoa and milk solids; and it has for its further object to combine such subordinate processes, so as to produce thereby a new product consisting of the elements of cocoa and milk combined in a soluble product.

The product is one capable of separately sustaining life, as it contains in proper proportions albuminoids, fat, dextrine, sugar, and mineral matter.

In order to carry out the first part of my process, I take a certain proportion of cocoa, preferably the cocoa of commerce, from which a portion of the cocoa-butter has been extracted mechanically. This I melt. I then take a similar part, by weight, of cane-sugar. The relative quantities of the two substances would vary—as, for example, according to the amount of cocoa-butter in the cocoa. This quantity of sugar I mix with one-tenth of its weight of water, the same being just enough to hold the sugar in solution at a high temperature, preferably from 280° to 290° Fahrenheit. I now provide myself with a kettle, preferably one acting as a pressure and also as a vacuum kettle, and also provided with a suitable stirring apparatus. These two substances—the cocoa melted and the sugar in solution—are suitably mixed and heated in the kettle until they preferably reach by degrees a high temperature—say that which corresponds to a pressure of forty pounds, or about 290° Fahrenheit—and here they are kept for thirty minutes until the cocoa-butter of the cocoa is decomposed and forms with the sugar a chemical compound that is soluble in water. This mass is then properly cooled, whereupon it will be found to produce and constitute a new product, the same being a soluble cocoa compound, the cocoa-butter of which has been decomposed, and has been combined with sugar in such a form as to render such product soluble, and at the same time make it more digestible and fit for food.

Cocoa-butter is a chemical compound of fatty acids and glycerin and is not soluble in water. It can be decomposed by the use of alkalies—say compounds of sodium or potassium—and when so decomposed the glycerin is discharged and preferably evaporated and the fatty acids combine with the alkalies to form certain salts. While this process is effectual for decomposing the cocoa-butter, the products are such as would be injurious if introduced into the system. Hence I seek to accomplish the result by other means.

I find that when the cocoa-butter is, as above set forth, associated with or put in the presence of sugar and then raised to a high temperature the process of decomposition will take place. I do not here insist upon the exact method suggested, nor do I think it necessary to affirm exactly what takes place. The idea, however, is to effect the decomposition of the cocoa-butter without the introduction of injurious or undesirable chemicals.

The second part of my invention or process consists in taking a suitable quantity of soluble cocoa, preferably the soluble cocoa compound such as last described, and adding thereto quantities or milk, there being about two parts of the soluble cocoa to eight parts of milk. Plainly, these particular proportions could be and must be varied according to the particular characteristics of the actual substances used. These substances are put into the kettle and suitably mixed, a convenient way of doing it being to put the milk in the same kettle after the soluble cocoa has been lowered in temperature, say, to about 210° Fahrenheit. The substances are then thoroughly mixed and the temperature of the entire compound or mass is raised slowly to a comparatively high heat. I find 240° degrees Fahrenheit or twelve pounds' pressure is proper, the object being particularly to sterilize the compound. It is kept at this temperature for about thirty minutes. The preparation is then cooled down and stirred, 212° Fahrenheit or some such temperature being a proper point at which to bring it. To reduce this substance to a convenient form for commercial purposes, it is then evaporated, the evaporation going on at first under ordinary pressure and later *in vacuo*. This evaporation preferably continues until a dry mass is produced, and this is then removed from the kettle and powdered. It is the final product arising from my process, and consists of dry, soluble, milk-cocoa compound powdered. It contains all the nutritive elements of the cocoa and the milk and can be quickly and easily dissolved in water and used as a beverage.

The presence of the cocoa-butter renders the cocoa food difficult for the cocoa product to be dissolved. By the use of this highly-concentrated sugar solution under the high pressure the butter is decomposed and a cocoa compound soluble in water is produced. Moreover, by this means I do not add to the cocoa elements the unnecessary deleterious substance sometimes added by the use of what is known as the "alkaline" or other such processes; nor do I add any dangerous or undesirable chemicals.

I have illustrated in the drawing a kettle which acts as a pressure and also as a vacuum kettle. I have not described this kettle, as it is no part of my present invention and as it is a copy of the one shown and described in my Patent of March 14, 1893, No. 493,342.

Where I have used the word "soluble" as applied to my product, I mean soluble as to the residue from cocoa-butter and not soluble as to the starch and cellulose which may be present in the product. The cocoa-butter contains or consists of glycerides of the stearin and palmitin or other fatty acids. By the application of my process it appears that the glycerin is driven off and the residue from the cocoa-butter is soluble in water.

I claim—

1. A process of producing cocoa which consists in subjecting the cocoa of commerce to a high temperature while mixed with sugar, substantially as and for the purpose described.

2. The process of producing combined milk solids and cocoa, which consists in mixing suitable proportions of the cocoa, said cocoa containing in addition to the non-fatty constituents of the cocoa, only the soluble residuum from cocoa butter, and milk, then subjecting the mixture to high temperature and then evaporating the same substantially as and for the purpose described.

3. The process of producing combined milk solids and cocoa, which consists in subjecting the cocoa of commerce to a high temperature while mixed with sugar until from the cocoa-butter there remains only a soluble residuum, then adding milk, then subjecting the mixture to high temperature, and then evaporating the same substantially as and for the purpose described.

4. A new article of food consisting of a dry powder of a brown color, said powder being free from oil usually contained in cocoa, and consisting only of cocoa solids including the soluble parts derived from cocoa butter, and sugar, substantially as described.

5. A new article of food consisting of a dry powder of a brown color, said powder being free from oil usually contained in cocoa, and consisting only of cocoa solids, including the soluble parts derived from cocoa butter, and the solids of milk and sugar, substantially as described.

Signed at Chicago, Illinois, September 13, 1894.

CARL RACH.

In presence of—
FRANCIS W. PARKER,
WALTER J. GUNTHORP.